United States Patent
Chen et al.

[11] Patent Number: 6,151,409
[45] Date of Patent: Nov. 21, 2000

[54] METHODS FOR COMPRESSING AND RECONSTRUCTING A COLOR IMAGE IN A COMPUTER SYSTEM

[75] Inventors: Liang-Gee Chen; Yuan-Chen Liu; Yung-Pin Lee; Po-Cheng Wu; Hsu-Tung Chen, all of Taipei, Taiwan

[73] Assignee: National Science Council, Taipei, Taiwan

[21] Appl. No.: 09/042,061

[22] Filed: Mar. 13, 1998

[51] Int. Cl.[7] .................. G06K 9/00; G06K 9/36
[52] U.S. Cl. ........................................... 382/166
[58] Field of Search .................. 382/166, 162, 382/180, 272

[56] References Cited

U.S. PATENT DOCUMENTS 5,392,072   2/1995   Rodriguez et al. ............ 348/405
5,978,098   11/1999  Takeuchi et al. .............. 358/433

*Primary Examiner*—Joseph Mancuso
*Assistant Examiner*—F. E. Cooperrider
*Attorney, Agent, or Firm*—Jackson Walker, LLP

[57] ABSTRACT

We discloses an efficient method for compressing a color image, visual block pattern truncation coding (VBPTC), in which the conventional block truncation coding (BTC) serves to encode an original image. This method defines the edge block according to human visual perception. If the difference between the two quantized values of BTC in a block is larger than a threshold which is defined by visual characteristics, the block will be identified as an edge block. In an edge block, the bitmap is adapted to compute block gradient orientation and to match the block pattern.

8 Claims, 1 Drawing Sheet

METHODS FOR COMPRESSING AND RE-CONSTRUCTING A COLOR IMAGE IN A COMPUTER SYSTEM

FIELD OF THE INVENTION

The present invention is related to a method of compressing and re-constructing a color image which is decomposed into non-overlapping contiguous rectangular blocks having an array of n×n pixels, in which each of said blocks is discriminated into an uniform block or an edge block.

BACKGROUND OF THE INVENTION

Image coding is getting significant for current applications, for instance, HDTV, multimedia, videophone, video conference and video storage. To remove possible redundancy in the related data is imperative since there are numerous data to be processed. The most practical method to meet the demand is data compression. Spatial and/or temporal redundancy is eliminated to accommodate communication or storage. The common techniques for data compression are predictive coding, transform coding, vector quantization (VQ), visual pattern image coding (VPIC), and block truncation coding (BTC), etc.

BTC [Edward J. Delp and O. Robert Mitchell, IEEE Transactions On Communications, Vol. Com-27, No. 9, September 1979] is an efficient method for block correlated signals. It is a moment preserving quantizer, that is, it quantizes block data into two values by preserving the first moment and the second moment. The advantages of BTC are simple computation, easy implementation and fine edge preservation, etc. The main problem of BTC is its high bit rate. In a fixed block size BTC, the bit rate of BTC is about 1.625 bits per pixel. There are some algorithms which can obtain a lower bit rate and fewer errors. However, the computation is so complex that it is hard to be implemented in VLSI design and in real-time processing.

VPIC is a high quality algorithm introduced by Dapang Chen and Alan C. Bovik [IEEE Transactions On Communications, Vol. 38, No. 12, December 1990]. Unlike other algorithms, VPIC uses pixel values of a block to compute block gradient orientation. Then the algorithm selects the bilevel block pattern with a simple viewing geometry model. Pixels are quantized into two levels by the block mean, gradient magnitude, the gradient orientation, and the predefined block pattern. High compression ratio is a marked advantage of VPIC. Nevertheless, if a block does not contain an obvious edge, VPIC will mismatch the block pattern. It will make serious error because of this mismatching.

Images are often corrupted because of the impulse noise caused by image capturing devices. Before being encoded, an image is often preprocessed by median filter. There are two kinds of filter technology: The first method processes every pixel of an image by filter no matter whether the image is with or without noise. The second method detects noise and then processes the image with filter technology. The high computation of the first method is remarkable; however, its distortion is gross. The second method dose not distort image much but it spends much time in image processing. As a result, it is imperative and significant to find an efficient algorithm to remove noise.

In terms of up-to-date image coding systems such as JPEG, an image is preprocessed so that the impulse noise is removed. Nevertheless, not all of the images are preprocessed by filter. Some of the reconstructed images will thus be inferior in quality. To combine preprocess and source coding may become the best solution possible to the problem.

SUMMARY OF THE INVENTION

The present invention provides a method for compressing a color image, which comprises the following steps performed in a computer system:

a) decomposing said image into non-overlapping contiguous rectangular blocks wherein each of said block comprises an array of 4×4 pixels;

b) generating a luminance value for each of said pixels within each of said blocks;

c) quantizing luminance values of said pixels within one block for each of said blocks in a sequence according to a position thereof into a lower mean value $Y_0$ and an upper mean value $Y_1$ by i) calculating an average luminance value, $Y_{avg}$, of said pixels within said block; ii) calculating an average luminance value of pixels within said block having luminance values lower than or equal to $Y_{avg}$ as said $Y_0$; and calculating an average luminance value of pixels within said block having luminance values greater than $Y_{avg}$ as said $Y_1$;

d) setting a block as an uniform block when $(Y_1-Y_0)/Y_0$ is less than a threshold value of 0.02–0.03, and as an edge block when $(Y_1-Y_0)/Y_0$ is not less than said threshold value;

e) for each uniform block outputting $Y_{avg}$ as the luminance values of said pixels thereof and an index representing an uniform block; and f) for each edge block I) creating a bitmap plane by comparing the luminance value of each pixel thereof with $Y_{avg}$, and assigning its corresponding bit in the bitmap plane a "0" value if the luminance value is less than or equal to $Y_{avg}$, otherwise assigning the corresponding bit in the bitmap plane a "1" value; II) deciding the block pattern of said edge block by computing a luminance gradient direction of the bitmap plane of said edge block and matching said luminance gradient direction with a bitmap plane table which is created by angle quantization using the bit values "0" and "1" of 4×4 bitmap plane; and III) outputting $Y_0$ and $Y_1$, and an index representing the decided block pattern of said edge block.

Preferably, the threshold value used in the method of the present invention is 0.03 or 0.02.

In the method of the present invention the angle quantization uses an angle of 45 degrees, and the bitmap plane table contains the following patterns:

$$\begin{pmatrix} 0 & 1 & 1 & 1 \\ 0 & 1 & 1 & 1 \\ 0 & 1 & 1 & 1 \\ 0 & 1 & 1 & 1 \end{pmatrix} \begin{pmatrix} 0 & 0 & 1 & 1 \\ 0 & 0 & 1 & 1 \\ 0 & 0 & 1 & 1 \\ 0 & 0 & 1 & 1 \end{pmatrix} \begin{pmatrix} 0 & 0 & 0 & 1 \\ 0 & 0 & 0 & 1 \\ 0 & 0 & 0 & 1 \\ 0 & 0 & 0 & 1 \end{pmatrix}$$

$$\begin{pmatrix} 1 & 1 & 1 & 1 \\ 1 & 1 & 1 & 1 \\ 0 & 1 & 1 & 1 \\ 0 & 0 & 1 & 1 \end{pmatrix} \begin{pmatrix} 1 & 1 & 1 & 1 \\ 0 & 1 & 1 & 1 \\ 0 & 0 & 1 & 1 \\ 0 & 0 & 0 & 1 \end{pmatrix} \begin{pmatrix} 0 & 1 & 1 & 1 \\ 0 & 0 & 1 & 1 \\ 0 & 0 & 0 & 1 \\ 0 & 0 & 0 & 0 \end{pmatrix} \begin{pmatrix} 0 & 0 & 1 & 1 \\ 0 & 0 & 0 & 1 \\ 0 & 0 & 0 & 0 \\ 0 & 0 & 0 & 0 \end{pmatrix}$$

$$\begin{pmatrix} 1 & 1 & 1 & 1 \\ 0 & 0 & 0 & 0 \\ 0 & 0 & 0 & 0 \\ 0 & 0 & 0 & 0 \end{pmatrix} \begin{pmatrix} 1 & 1 & 1 & 1 \\ 1 & 1 & 1 & 1 \\ 0 & 0 & 0 & 0 \\ 0 & 0 & 0 & 0 \end{pmatrix} \begin{pmatrix} 1 & 1 & 1 & 1 \\ 1 & 1 & 1 & 1 \\ 1 & 1 & 1 & 1 \\ 0 & 0 & 0 & 0 \end{pmatrix}$$

$$\begin{pmatrix}1&1&1&1\\1&1&1&1\\1&1&1&0\\1&1&0&0\end{pmatrix}\begin{pmatrix}1&1&1&1\\1&1&1&0\\1&1&0&0\\1&0&0&0\end{pmatrix}\begin{pmatrix}1&1&1&0\\1&1&0&0\\1&0&0&0\\0&0&0&0\end{pmatrix}\begin{pmatrix}1&1&0&0\\1&0&0&0\\0&0&0&0\\0&0&0&0\end{pmatrix}$$

$$\begin{pmatrix}1&0&0&0\\1&0&0&0\\1&0&0&0\\1&0&0&0\end{pmatrix}\begin{pmatrix}1&1&0&0\\1&1&0&0\\1&1&0&0\\1&1&0&0\end{pmatrix}\begin{pmatrix}1&1&1&0\\1&1&1&0\\1&1&1&0\\1&1&1&0\end{pmatrix}$$

$$\begin{pmatrix}0&0&0&0\\0&0&0&0\\1&0&0&0\\1&1&0&0\end{pmatrix}\begin{pmatrix}0&0&0&0\\1&0&0&0\\1&1&0&0\\1&1&1&0\end{pmatrix}\begin{pmatrix}1&0&0&0\\1&1&0&0\\1&1&1&0\\1&1&1&1\end{pmatrix}\begin{pmatrix}1&1&0&0\\1&1&1&0\\1&1&1&1\\1&1&1&1\end{pmatrix}$$

$$\begin{pmatrix}0&0&0&0\\1&1&1&1\\1&1&1&1\\1&1&1&1\end{pmatrix}\begin{pmatrix}0&0&0&0\\0&0&0&0\\1&1&1&1\\1&1&1&1\end{pmatrix}\begin{pmatrix}0&0&0&0\\0&0&0&0\\0&0&0&0\\1&1&1&1\end{pmatrix}$$

$$\begin{pmatrix}0&0&0&0\\0&0&0&0\\0&0&0&1\\0&0&1&1\end{pmatrix}\begin{pmatrix}0&0&0&0\\0&0&0&1\\0&0&1&1\\0&1&1&1\end{pmatrix}\begin{pmatrix}0&0&0&1\\0&0&1&1\\0&1&1&1\\1&1&1&1\end{pmatrix}\begin{pmatrix}0&0&1&1\\0&1&1&1\\1&1&1&1\\1&1&1&1\end{pmatrix}.$$

The present invention also discloses a method for reconstructing said color image from said index, $Y_{avg}$, $Y_0$ and $Y_1$ compressed according to the method of the present invention, which comprises the following steps performed in a computer system:

generating said blocks according to the sequence of the indexes generated and combining said blocks into an image according to the positions thereof, wherein the luminance values of the pixels within one block for each of said blocks are set as $Y_{avg}$, when the index of said block is the index representing an uniform block; otherwise the block pattern of the block is obtained from the bitmap plane table by using the index, the luminance values of the pixels having a bit value of "0" in the block pattern are set as $Y_0$, and the luminance values of the pixels having a bit value of "1" in the block pattern are set as $Y_1$.

DETAILED DESCRIPTION OF THE INVENTION

Figure 1:
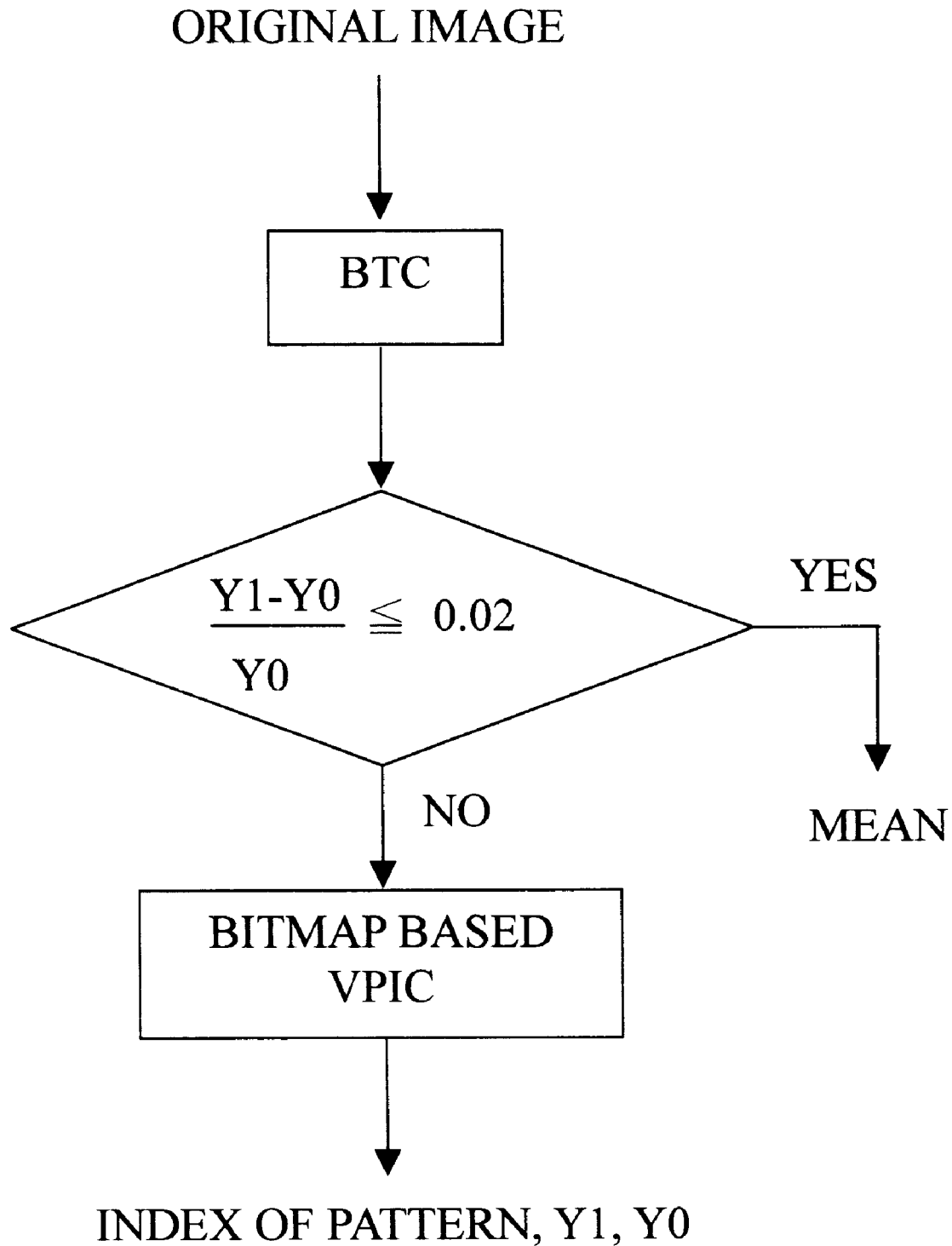

The present invention proposes a new image coding algorithm based on block truncation coding (BTC). The new algorithm combines preprocessing and source coding. Not only can it remove the impulse noise but also can it encode images by little bits.

We recommend an efficient algorithm, visual block pattern truncation coding (VBPTC), in which BTC serves to encode an original image. This algorithm defines the edge block according to human visual perception. If the difference between the two quantized values of BTC in a block is larger than a threshold which is defined by visual characteristics, the block will be identified as an edge block. In an edge block, the bitmap is adapted to compute block gradient orientation and to match the block pattern. Experimental results show that the mean square error (MSE) of the algorithm is less than VPIC by half in the same bit rate. This coding system has many merits such as fair edge preservation, low computation complexity, high compression ratio, easy implementation, and satisfactory reconstructed image. We also use the algorithm to remove impulse noise. Simulation results show that the noise can be removed without prefiltering.

A conventional BTC will be the most approvable algorithm if the drawback of low compression ratio is remedied. The new BTC-based algorithm of the present invention applies VPIC to reduce the bit rate of BTC. To improve the defects of mismatching patterns by VPIC, we use the bitmap of BTC to select block patterns. The method of the present invention first demands to split an image into 4×4 blocks, and calculates $Y_{avg}$, $Y_0$, and $Y_1$. The algorithm can obtain the bitmap after BTC has encoded a 4×4 block. Utilizing the coded bitmap, we find $\Delta_x B$ and $\Delta_y B$ which represent the gradient of x direction and y direction.

$$\Delta_x B = \text{SUM}(B_{n,m}:4i+2\leq n\leq 4i+3, 4j\leq m\leq 4j+3) - \text{SUM}(B_{n,m}:4i\leq n\leq 4i+3, 4j\leq m\leq 4j+3) \quad (10)$$

$$\Delta_y B = \text{SUM}(B_{n,m}:4i\leq n\leq 4i+3, 4j+2\leq m\leq 4j+3) - \text{SUM}(B_{n,m}:4i\leq n\leq 4i+3, 4j\leq m\leq 4j+1) \quad (20)$$

Where $B_{n,m}$ is the bitmap of the block. The block gradient orientation can be find out by the following equation:

$$\angle \Delta B = \tan^{-1}(\Delta_y B / \Delta_x B) \quad (30)$$

After computing the block gradient orientation, we can compare the bitmap with the previously defined block pattern. An index of the most similar block pattern functions as the index of bitmap.

Four benchmark images serve as simulation. The difference between VPIC and bitmap based VPIC (BVPIC) is the computation of gradient orientation. The gradient orientation of BVPIC is computed by equations 10 and 20. From Table 1, we could find that BVPIC is more accurate than VPIC. While computing block gradient orientation, we count the number "1" of bitmap only; as a result, the computation complexity decreases in comparison with VPIC.

TABLE 1

THE COMPARISONS OF VPIC AND BVPIC

| Image | Block size | VPIC | BVPIC | BVPIC/VPIC × 100% |
|---|---|---|---|---|
| (a) MSE (mean square error) | | | | |
| | | MSE | | Ratio |
| Lena | 4 × 4 | 68.80 | 58.32 | 84.77% |
| Baboon | 4 × 4 | 556.32 | 415.77 | 74.74% |
| Pepper | 4 × 4 | 108.72 | 55.17 | 50.75% |
| Jet | 4 × 4 | 160.02 | 74.00 | 46.24% |
| (b) MAE (mean absolute error) | | | | |
| | | MAE | | Ratio |
| Lena | 4 × 4 | 4.47 | 4.20 | 93.96% |
| Baboon | 4 × 4 | 14.75 | 12.95 | 87.80% |
| Pepper | 4 × 4 | 5.12 | 4.35 | 89.56% |
| Jet | 4 × 4 | 5.26 | 4.08 | 77.57% |
| (b) PSNR (peak signal noise ratio) | | | | |
| | | PSNR | | Enhancement |
| Lena | 4 × 4 | 29.75 | 30.47 | 2.42% |
| Baboon | 4 × 4 | 20.68 | 21.94 | 6.09% |

TABLE 1-continued

THE COMPARISONS OF VPIC AND BVPIC

| Image | Block size | VPIC | BVPIC | BVPIC/VPIC × 100% |
|---|---|---|---|---|
| Pepper | 4 × 4 | 27.77 | 30.71 | 10.59% |
| Jet | 4 × 4 | 26.09 | 29.44 | 12.84% |

Two types of blocks, uniform blocks and edge blocks, are usually classified according to their block variance. There are several methods of defining the pattern of a block. We propose that the identification of a block should base on the characteristics of human vision. After the encoding process of BTC, there are two quantized values whose difference represents the changes of the illuminative intensity within a block. According to the Weber-Fechner Law [W. K. Pratt, *Digital image processing,* John Wiley & Sons, Inc., 1991 ], the quotient of the fraction of illuminative intensity in a region is an essential reference for human visual perception. The sensible stimulus for human eyes to the changes of illumination, the contrast sensitivity, is dependent on the intensity of the surrounding.

A given patch of light of intensity I+ΔI surrounded by a background of intensity I. The sensible difference for normal human eyes ΔI is to be determined as a function of I. The ratio ΔI/I, known as Weber fraction, is almost constant at the value about 0.02. Recognizing the value of minimum contrast sensitivity of eyes, we define the block whose difference of illuminative intensity is perceivable as an edge block and the imperceptible one as an uniform block. Let the difference between $Y_1$ and $Y_0$ be ΔI, and $Y_0$ be the background I. If the quotient of $(Y_1-Y_0)$ and $Y_0$ is less than 0.02, the block is an uniform block. Otherwise, it is an edge block. Referring to FIG. 1, illustrated is a flowchart of VBPTC. The procedures are described as follows:

1. An image is divided into n pels by n lines blocks (typically n=4).
2. The block is coded by BTC.
3. If the ratio of $Y_1-Y_0$ and $Y_0$ and $Y_0$ is less than 0.02, it is an uniform block. Otherwise, it is an edge block.
4. If the block is an edge block, the bitmap is used to decide the block pattern by bitmap based VPIC.
5. Finally VBPTC transmits the quantized values or the mean as well as the index of the block pattern.

Four benchmarks function as test examples. Table 2 shows the results of the VPIC and VBPTC algorithm. The bitrate is fixed in about 0.9 bit per pixel. VBPTC uses the mean as the threshold of BTC. $Y_0$ and $Y_1$ are set as the lower mean and the upper mean respectively.

TABLE 2

THE COMPARISONS OF VBPTC

| Image | VPIC | VBPTC |
|---|---|---|
| (a) MSE | | |
| Lena | 127.80 | 52.29 |
| Baboon | 634.63 | 365.88 |
| Pepper | 185.35 | 48.93 |
| Jet | 279.81 | 67.14 |
| (b) MAE | | |
| Lena | 5.96 | 4.05 |
| Baboon | 16.29 | 12.14 |
| Pepper | 6.61 | 4.11 |

TABLE 2-continued

THE COMPARISONS OF VBPTC

| Image | VPIC | VBPTC |
|---|---|---|
| Jet | 7.50 | 4.04 |
| (c) PSNR | | |
| Lena | 27.07 | 30.95 |
| Baboon | 20.11 | 22.50 |
| Pepper | 25.45 | 31.24 |
| Jet | 23.66 | 29.86 |

EXAMPLE 1

Uniform Block

An 4×4 block having luminance values as follows are compressed and reconstructed in this example:

$$\begin{pmatrix} 141 & 140 & 139 & 141 \\ 141 & 140 & 139 & 141 \\ 141 & 140 & 139 & 141 \\ 141 & 140 & 139 & 141 \end{pmatrix}$$

First $Y_{avg}$ is calculated by averaging the luminance values within the block, which is 140. $Y_0$ is calculated by [(140× 8)+(139×4)]/12=140; $Y_1$ is calculated by (141×4)/4=141. The threshold value, $(Y_1-Y_0)/Y_0=0.007$, is less than 0.03, and thus the block is set as an inform block. An index representing an uniform block, for example, 0, and $Y_{avg}$ are output from an encoding terminal.

A block reconstructed from the index and $Y_{avg}$ received in an decoding terminal will be as follows:

$$\begin{pmatrix} 141 & 140 & 140 & 140 \\ 141 & 140 & 140 & 140 \\ 141 & 140 & 140 & 140 \\ 141 & 140 & 140 & 140 \end{pmatrix}.$$

EXAMPLE 2

Edge Block

An 4×4 block having luminance values as follows are compressed and reconstructed in this example:

$$\begin{pmatrix} 97 & 97 & 98 & 101 \\ 95 & 95 & 97 & 98 \\ 105 & 105 & 95 & 97 \\ 99 & 99 & 103 & 97 \end{pmatrix}$$

First $Y_{avg}$ is calculated by averaging the luminance values within the block, which is 98.625. $Y_0$ is calculated by [(95×3)+(97×5)+(98×2)]/10=97; $Y_1$ is calculated by [(99× 2)+101+103+(105×2)]/6=102. The threshold value, $(Y_1-Y_0)/Y_0=0.052$, is greater than 0.03, and thus the block is set as a edge block. A bitmap plane is then generated by comparing the luminance value of each pixel thereof with $Y_{avg}$, and assigning its corresponding bit in the bitmap plane a "0" value if the luminance value is less than or equal to $Y_{avg}$, otherwise assigning the corresponding bit in the bitmap plane a "1" value. The bitmap plane of said edge block is as follows:

$$\begin{pmatrix} 0 & 0 & 0 & 1 \\ 0 & 0 & 0 & 0 \\ 1 & 1 & 0 & 0 \\ 1 & 1 & 1 & 0 \end{pmatrix}$$

and has $\Delta_x B_{i,j} = -0.125$, $\Delta_y B_{i,j} = 0.25$ and $\angle \Delta B_{i,j} = -45°$. The block pattern of said edge block is decided by matching said luminance gradient direction, $\angle \Delta B_{i,j}$, with a bitmap plane table which is created by angle quantization using the bit values "0" and "1" of 4×4 bitmap plane. An index representing the decided block pattern of said edge block, for example, 18, and $Y_0$ and $Y_1$ are output from an encoding terminal.

A block reconstructed from the index and $Y_0$ and $Y_1$ received in an decoding terminal will be as follows:

$$\begin{pmatrix} 97 & 97 & 97 & 97 \\ 102 & 97 & 97 & 97 \\ 102 & 102 & 97 & 97 \\ 102 & 102 & 102 & 97 \end{pmatrix}.$$

What is claimed is:

1. A method for compressing a color image comprising the following steps performed in a computer system:
   a) decomposing said image into non-overlapping contiguous rectangular blocks wherein each of said block comprises an array of 4×4 pixels;
   b) generating a luminance value for each of said pixels within each of said blocks;
   c) quantizing luminance values of said pixels within one block for each of said blocks in a sequence according to a position thereof into a lower mean value $Y_0$ and an upper mean value $Y_1$ by i) calculating an average luminance value, $Y_{avg}$, of said pixels within said block; ii) calculating an average luminance value of pixels within said block having luminance values lower than or equal to $Y_{avg}$ as said $Y_0$; and iii) calculating an average luminance value of pixels within said block having luminance values greater than $Y_{avg}$ as said $Y_1$;
   d) setting a block as an uniform block when $(Y_1-Y_0)/Y_0$ is less than a threshold value within a range of 0.02–0.03, and as an edge block when $(Y_1-Y_0)/Y_0$ is not less than said threshold value;
   e) for each uniform block outputting $Y_{avg}$ as the luminance values of said pixels thereof and an index representing an uniform block; and
   f) for each edge block I) creating a bitmap plane by comparing the luminance value of each pixel thereof with $Y_{avg}$, and assigning its corresponding bit in the bitmap plane a "0" value if the luminance value is less than or equal to $Y_{avg}$, otherwise assigning the corresponding bit in the bitmap plane a "1" value; II) deciding the block pattern of said edge block by computing a luminance gradient direction of the bitmap plane of said edge block and matching said luminance gradient direction with a bitmap plane table which is created by angle quantization using the bit values "0" and "1" of 4×4 bitmap plane; and III) outputting $Y_0$ and $Y_1$, and an index representing the decided block pattern of said edge block.

2. The method according to claim 1, wherein the threshold value is 0.03.

3. The method according to claim 1, wherein the threshold value is 0.02.

4. The method according to claim 1, wherein the angle quantization uses an angle of 45 degrees, and the bitmap plane table contains the following patterns:

$$\begin{pmatrix} 0 & 1 & 1 & 1 \\ 0 & 1 & 1 & 1 \\ 0 & 1 & 1 & 1 \\ 0 & 1 & 1 & 1 \end{pmatrix} \begin{pmatrix} 0 & 0 & 1 & 1 \\ 0 & 0 & 1 & 1 \\ 0 & 0 & 1 & 1 \\ 0 & 0 & 1 & 1 \end{pmatrix} \begin{pmatrix} 0 & 0 & 0 & 1 \\ 0 & 0 & 0 & 1 \\ 0 & 0 & 0 & 1 \\ 0 & 0 & 0 & 1 \end{pmatrix}$$

$$\begin{pmatrix} 1 & 1 & 1 & 1 \\ 1 & 1 & 1 & 1 \\ 0 & 1 & 1 & 1 \\ 0 & 0 & 1 & 1 \end{pmatrix} \begin{pmatrix} 1 & 1 & 1 & 1 \\ 0 & 1 & 1 & 1 \\ 0 & 0 & 1 & 1 \\ 0 & 0 & 0 & 1 \end{pmatrix} \begin{pmatrix} 0 & 1 & 1 & 1 \\ 0 & 0 & 1 & 1 \\ 0 & 0 & 0 & 1 \\ 0 & 0 & 0 & 0 \end{pmatrix} \begin{pmatrix} 0 & 0 & 1 & 1 \\ 0 & 0 & 0 & 1 \\ 0 & 0 & 0 & 0 \\ 0 & 0 & 0 & 0 \end{pmatrix}$$

$$\begin{pmatrix} 1 & 1 & 1 & 1 \\ 0 & 0 & 0 & 0 \\ 0 & 0 & 0 & 0 \\ 0 & 0 & 0 & 0 \end{pmatrix} \begin{pmatrix} 1 & 1 & 1 & 1 \\ 1 & 1 & 1 & 1 \\ 0 & 0 & 0 & 0 \\ 0 & 0 & 0 & 0 \end{pmatrix} \begin{pmatrix} 1 & 1 & 1 & 1 \\ 1 & 1 & 1 & 1 \\ 1 & 1 & 1 & 1 \\ 0 & 0 & 0 & 0 \end{pmatrix}$$

$$\begin{pmatrix} 1 & 1 & 1 & 1 \\ 1 & 1 & 1 & 1 \\ 1 & 1 & 1 & 0 \\ 1 & 1 & 0 & 0 \end{pmatrix} \begin{pmatrix} 1 & 1 & 1 & 1 \\ 1 & 1 & 1 & 0 \\ 1 & 1 & 0 & 0 \\ 1 & 0 & 0 & 0 \end{pmatrix} \begin{pmatrix} 1 & 1 & 1 & 0 \\ 1 & 1 & 0 & 0 \\ 1 & 0 & 0 & 0 \\ 0 & 0 & 0 & 0 \end{pmatrix} \begin{pmatrix} 1 & 1 & 0 & 0 \\ 1 & 0 & 0 & 0 \\ 0 & 0 & 0 & 0 \\ 0 & 0 & 0 & 0 \end{pmatrix}$$

$$\begin{pmatrix} 1 & 0 & 0 & 0 \\ 1 & 0 & 0 & 0 \\ 1 & 0 & 0 & 0 \\ 1 & 0 & 0 & 0 \end{pmatrix} \begin{pmatrix} 1 & 1 & 0 & 0 \\ 1 & 1 & 0 & 0 \\ 1 & 1 & 0 & 0 \\ 1 & 1 & 0 & 0 \end{pmatrix} \begin{pmatrix} 1 & 1 & 1 & 0 \\ 1 & 1 & 1 & 0 \\ 1 & 1 & 1 & 0 \\ 1 & 1 & 1 & 0 \end{pmatrix}$$

$$\begin{pmatrix} 0 & 0 & 0 & 0 \\ 0 & 0 & 0 & 0 \\ 1 & 0 & 0 & 0 \\ 1 & 1 & 0 & 0 \end{pmatrix} \begin{pmatrix} 0 & 0 & 0 & 0 \\ 1 & 0 & 0 & 0 \\ 1 & 1 & 0 & 0 \\ 1 & 1 & 1 & 0 \end{pmatrix} \begin{pmatrix} 1 & 0 & 0 & 0 \\ 1 & 1 & 0 & 0 \\ 1 & 1 & 1 & 0 \\ 1 & 1 & 1 & 1 \end{pmatrix} \begin{pmatrix} 1 & 1 & 0 & 0 \\ 1 & 1 & 1 & 0 \\ 1 & 1 & 1 & 1 \\ 1 & 1 & 1 & 1 \end{pmatrix}$$

$$\begin{pmatrix} 0 & 0 & 0 & 0 \\ 1 & 1 & 1 & 1 \\ 1 & 1 & 1 & 1 \\ 1 & 1 & 1 & 1 \end{pmatrix} \begin{pmatrix} 0 & 0 & 0 & 0 \\ 0 & 0 & 0 & 0 \\ 1 & 1 & 1 & 1 \\ 1 & 1 & 1 & 1 \end{pmatrix} \begin{pmatrix} 0 & 0 & 0 & 0 \\ 0 & 0 & 0 & 0 \\ 0 & 0 & 0 & 0 \\ 1 & 1 & 1 & 1 \end{pmatrix}$$

$$\begin{pmatrix} 0 & 0 & 0 & 0 \\ 0 & 0 & 0 & 0 \\ 0 & 0 & 0 & 1 \\ 0 & 0 & 1 & 1 \end{pmatrix} \begin{pmatrix} 0 & 0 & 0 & 0 \\ 0 & 0 & 0 & 1 \\ 0 & 0 & 1 & 1 \\ 0 & 1 & 1 & 1 \end{pmatrix} \begin{pmatrix} 0 & 0 & 0 & 1 \\ 0 & 0 & 1 & 1 \\ 0 & 1 & 1 & 1 \\ 1 & 1 & 1 & 1 \end{pmatrix} \begin{pmatrix} 0 & 0 & 1 & 1 \\ 0 & 1 & 1 & 1 \\ 1 & 1 & 1 & 1 \\ 1 & 1 & 1 & 1 \end{pmatrix}.$$

5. A method for reconstructing said color image from said index, $Y_{avg}$, $Y_0$ and $Y_1$ obtained according to the method of claim 1 comprising the following steps performed in a computer system:

generating said blocks according to the sequence of the indexes generated and combining said blocks into an image according to the positions thereof, wherein the luminance values of the pixels within one block for each of said blocks are set as $Y_{avg}$, when the index of said block is the index representing an uniform block; otherwise the block pattern of the block is obtained from the bitmap plane table by using the index, the luminance values of the pixels having a bit value of "0" in the block pattern are set as $Y_0$, and the luminance values of the pixels having a bit value of "1" in the block pattern are set as $Y_1$.

6. The method according to claim 5, wherein the threshold value is 0.03.

7. The method according to claim 5, wherein the threshold value is 0.02.

8. The method according to claim 5, wherein the angle quantization uses an angle of 45 degrees, and the bitmap plane table contains the following patterns:

$$\begin{pmatrix} 0 & 1 & 1 & 1 \\ 0 & 1 & 1 & 1 \\ 0 & 1 & 1 & 1 \\ 0 & 1 & 1 & 1 \end{pmatrix} \begin{pmatrix} 0 & 0 & 1 & 1 \\ 0 & 0 & 1 & 1 \\ 0 & 0 & 1 & 1 \\ 0 & 0 & 1 & 1 \end{pmatrix} \begin{pmatrix} 0 & 0 & 0 & 1 \\ 0 & 0 & 0 & 1 \\ 0 & 0 & 0 & 1 \\ 0 & 0 & 0 & 1 \end{pmatrix}$$

$$\begin{pmatrix} 1 & 1 & 1 & 1 \\ 1 & 1 & 1 & 1 \\ 0 & 1 & 1 & 1 \\ 0 & 0 & 1 & 1 \end{pmatrix} \begin{pmatrix} 1 & 1 & 1 & 1 \\ 0 & 1 & 1 & 1 \\ 0 & 0 & 1 & 1 \\ 0 & 0 & 0 & 1 \end{pmatrix} \begin{pmatrix} 0 & 1 & 1 & 1 \\ 0 & 0 & 1 & 1 \\ 0 & 0 & 0 & 1 \\ 0 & 0 & 0 & 0 \end{pmatrix} \begin{pmatrix} 0 & 0 & 1 & 1 \\ 0 & 0 & 0 & 1 \\ 0 & 0 & 0 & 0 \\ 0 & 0 & 0 & 0 \end{pmatrix}$$

$$\begin{pmatrix} 1 & 1 & 1 & 1 \\ 0 & 0 & 0 & 0 \\ 0 & 0 & 0 & 0 \\ 0 & 0 & 0 & 0 \end{pmatrix} \begin{pmatrix} 1 & 1 & 1 & 1 \\ 1 & 1 & 1 & 1 \\ 0 & 0 & 0 & 0 \\ 0 & 0 & 0 & 0 \end{pmatrix} \begin{pmatrix} 1 & 1 & 1 & 1 \\ 1 & 1 & 1 & 1 \\ 1 & 1 & 1 & 1 \\ 0 & 0 & 0 & 0 \end{pmatrix}$$

$$\begin{pmatrix} 1 & 1 & 1 & 1 \\ 1 & 1 & 1 & 1 \\ 1 & 1 & 1 & 0 \\ 1 & 1 & 0 & 0 \end{pmatrix} \begin{pmatrix} 1 & 1 & 1 & 1 \\ 1 & 1 & 1 & 0 \\ 1 & 1 & 0 & 0 \\ 1 & 0 & 0 & 0 \end{pmatrix} \begin{pmatrix} 1 & 1 & 1 & 0 \\ 1 & 1 & 0 & 0 \\ 1 & 0 & 0 & 0 \\ 0 & 0 & 0 & 0 \end{pmatrix} \begin{pmatrix} 1 & 1 & 0 & 0 \\ 1 & 0 & 0 & 0 \\ 0 & 0 & 0 & 0 \\ 0 & 0 & 0 & 0 \end{pmatrix}$$

$$\begin{pmatrix} 1 & 0 & 0 & 0 \\ 1 & 0 & 0 & 0 \\ 1 & 0 & 0 & 0 \\ 1 & 0 & 0 & 0 \end{pmatrix} \begin{pmatrix} 1 & 1 & 0 & 0 \\ 1 & 1 & 0 & 0 \\ 1 & 1 & 0 & 0 \\ 1 & 1 & 0 & 0 \end{pmatrix} \begin{pmatrix} 1 & 1 & 1 & 0 \\ 1 & 1 & 1 & 0 \\ 1 & 1 & 1 & 0 \\ 1 & 1 & 1 & 0 \end{pmatrix}$$

$$\begin{pmatrix} 0 & 0 & 0 & 0 \\ 0 & 0 & 0 & 0 \\ 1 & 0 & 0 & 0 \\ 1 & 1 & 0 & 0 \end{pmatrix} \begin{pmatrix} 0 & 0 & 0 & 0 \\ 1 & 0 & 0 & 0 \\ 1 & 1 & 0 & 0 \\ 1 & 1 & 1 & 0 \end{pmatrix} \begin{pmatrix} 1 & 0 & 0 & 0 \\ 1 & 1 & 0 & 0 \\ 1 & 1 & 1 & 0 \\ 1 & 1 & 1 & 1 \end{pmatrix} \begin{pmatrix} 1 & 1 & 0 & 0 \\ 1 & 1 & 1 & 0 \\ 1 & 1 & 1 & 1 \\ 1 & 1 & 1 & 1 \end{pmatrix}$$

$$\begin{pmatrix} 0 & 0 & 0 & 0 \\ 1 & 1 & 1 & 1 \\ 1 & 1 & 1 & 1 \\ 1 & 1 & 1 & 1 \end{pmatrix} \begin{pmatrix} 0 & 0 & 0 & 0 \\ 0 & 0 & 0 & 0 \\ 1 & 1 & 1 & 1 \\ 1 & 1 & 1 & 1 \end{pmatrix} \begin{pmatrix} 0 & 0 & 0 & 0 \\ 0 & 0 & 0 & 0 \\ 0 & 0 & 0 & 0 \\ 1 & 1 & 1 & 1 \end{pmatrix}$$

$$\begin{pmatrix} 0 & 0 & 0 & 0 \\ 0 & 0 & 0 & 0 \\ 0 & 0 & 0 & 1 \\ 0 & 0 & 1 & 1 \end{pmatrix} \begin{pmatrix} 0 & 0 & 0 & 0 \\ 0 & 0 & 0 & 1 \\ 0 & 0 & 1 & 1 \\ 0 & 1 & 1 & 1 \end{pmatrix} \begin{pmatrix} 0 & 0 & 0 & 1 \\ 0 & 0 & 1 & 1 \\ 0 & 1 & 1 & 1 \\ 1 & 1 & 1 & 1 \end{pmatrix} \begin{pmatrix} 0 & 0 & 1 & 1 \\ 0 & 1 & 1 & 1 \\ 1 & 1 & 1 & 1 \\ 1 & 1 & 1 & 1 \end{pmatrix}.$$

* * * * *